United States Patent [19]
Hosokawa et al.

[11] 4,327,314
[45] Apr. 27, 1982

[54] INVERTER SYSTEM FOR DRIVING SYNCHRONOUS MOTOR

[75] Inventors: Yasuhiko Hosokawa; Kanji Katsuki; Toshio Suzuki, all of Kobe, Japan

[73] Assignee: Mitsubishi Denki Kabushiki Kaisha, Tokyo, Japan

[21] Appl. No.: 187,976

[22] Filed: Sep. 16, 1980

[30] Foreign Application Priority Data

Sep. 19, 1979 [JP] Japan .................................. 54-120963

[51] Int. Cl.³ .......................... H02P 5/40; H02P 1/26
[52] U.S. Cl. ..................................... 318/722; 318/713
[58] Field of Search ............... 318/709, 720, 722, 723, 318/712, 713

[56] References Cited

U.S. PATENT DOCUMENTS

| | | | |
|---|---|---|---|
| 3,793,573 | 2/1974 | Tsuboi .................. | 318/722 |
| 3,997,825 | 12/1976 | Miyasita et al. ............ | 318/713 |
| 4,160,938 | 7/1979 | Akamatsu .............. | 318/722 |

OTHER PUBLICATIONS

E. Muller et al., "Undershoot Control Techniques & Their Influence on Invertor Output Voltage", *Brown Bouiri Rev. 1-73*, pp. 35-44.

Gemp et al., "High Power Adjustable Frequency Power Conditioning System for a Linear Induction Motor", *IAS 77 Annual*, pp. 248-262.

Klocker et al., "Rosy ein Rotatrouspruistand zum Erdroben des Eisenlosen Synchronlinear Motors", *Seimans-Zehschnft* 52 (1978), Heft 3, pp. 109-117.

*Primary Examiner*—David Smith, Jr.
*Attorney, Agent, or Firm*—Wenderoth, Lind & Ponack

[57] ABSTRACT

The disclosed inverter system comprises three three-phase inverters connected in parallel across a positive and a negative terminal of a DC source including a negative terminal, and two three-phase transformers each including star-connected primary windings connected at one end to three AC outputs of the mating inverter and at the other ends connected to the neutral source terminal. Three secondary windings of each transformer are serially connected to those of the other transformer across three star-connected phase windings of a synchronous motor and three AC output of that inverter not connected to the transformer. The motor includes a neutral terminal connected to the neutral source terminal.

3 Claims, 7 Drawing Figures

INVERTER SYSTEM FOR DRIVING SYNCHRONOUS MOTOR

BACKGROUND OF THE INVENTION

This invention relates to an inverter system for driving a synchronous motor by a plurality of unit inverters arranged in multiplexed relationship.

With the development of high speed switching semiconductor devices, inverter systems for transforming the DC to the AC power have recently expanded in the field of their application and particularly been widely employed to control the operation of AC motors. In the control of AC motors, voltage and current waveforms applied to such motors are desirably low in ripples. To this end, several unit inverters have been arranged in multiplexed relationship by disposing transformers between the unit inverters and an associated electric motor. However where this multiplexed inverters drive the synchronous motor, the same must operate the motor at a null operating frequency developed on the AC side thereof, that is, with direct current during the start of the motor and others. This has caused a problem that the transformers are saturated. As a result, multiplexed inverter systems of the conventional construction have not been employed to operate synchronous motors.

In order to solve such a problem, there are well known multiplexed inverter systems of the type comprising a DC source, a first set of three inverters connected in parallel circuit relationship across the DC source one for each phase of the system, a second set of three inverters also connected in parallel circuit relationship across the DC source one for each phase of the system, all the inverters being identical in construction to one another, a three-phase synchronous motor including three phase windings, each of the inverters of the first set including a pair of outputs connected across an associated one of the phase windings of the synchronous motor through a secondary winding of an electrically insulated transformer connected across a pair of outputs of the associated inverters of the second set.

Upon starting the synchronous motor, the three inverters of the second set are operated only to shortcircuit the mating transformers while only the three inverters of first set are operated to supply an electric power to the synchronous motor resulting in the start of the motor. When an operating frequency provided by the AC side of the inverters of the first set rises to a predetermined frequency from its null magnitude, the inverters of the second set are initiated to perform the inverting operation to induce voltages in rectangular waveforms across the secondary windings of the associated transformer respectively. As a result, output voltages from the inverters of the first set are added to those from the associated second inverters and then applied across the mating phase windings of the synchronous motor respectively. Accordingly the inverters of the first and second sets are initiaed to be operated as a multiplexed inverter system.

Therefore conventional multiplexed inverter systems such as described above are enabled to start the synchronous motor with direct current until the synchronous motor is operated with alternating current at any frequency.

In such conventional multiplexed inverter systems, however, the synchronous motor has been required to be electrically connected to two sets of inverters through six power supply leads, two for each phase of the motor. Also the number of the components has been large. For example, even though one pair of inverters of the first and second sets for each phase of the system would be formed into a single-phase inverter composed of a pair of semiconductor inverters each including four thyristors connected into a bridge configuration connected across the DC source in the well known manner, a single one of those single phase inverter has been required to be provided for each phase of the system. Therefore conventional multiplexed inverter systems such as described above have been disadvantageous in that the resulting systems are large-sized and also expensive.

Accordingly it is an object of the present invention to eliminate the disadvantages of the prior art practice as described above by the provision of an inverter system for driving a synchronous motor, using a plurality of three-phase inverters connected into a three-phase full-wave configuration and decreasing the number of power supply leads electrically connecting the three-phase inverters to the synchronous motor to four (4) by connecting phase windings of the synchronous motor into a start configuration and causing one of the power supply leads to serve as a neutral lead the synchronous motor.

SUMMARY OF THE INVENTION

The present invention provides an inverter system for driving a synchronous motor, comprising a synchronous motor including star-connected phase windings and a set of three-phase AC input terminals and a neutral terminal, a DC source including a positive terminal, a negative terminal and an intermediate terminal for deriving an intermediate voltage lying between voltages at the positive and negative terminals, the intermediate terminal being connected to the neutral terminal of the synchronous motor, N three-phase inverters connected in parallel circuit relationship across the positive and negative terminal of the DC source where N designates an integer having a value larger than unity, each of the three-phase inverters including a set of three-phase AC output terminals and transforming a DC power from the DC source to a three-phase AC power, (N−1) electrically insulated three-phase transformers connected to the (N−1) three-phase inverters respectively so that primary windings of each three-phase transformer are connected in a star configuration to the set of three-phase AC terminals of the three-phase inverter connected threreto and secondary windings thereof are connected in series circuit relationship to those of the other three-phase transformers to form series combinations one for each phase of the system, the star-connected primary windings of each of the three-phase transformers including a neutral point connected to the intermediate terminals of the DC source, the series combinations being connected at one end to the set of three-phase input terminals of the synchronous motor and at the other ends to the set of three-phase AC output terminals of the three-phase inverter not connected to the three-phase transformer.

Each of the three-phase inverters may preferably comprise three semiconductor inverters each including four thyristors connected into a bridge configuration and a series combination of a commutation capacitor and a commutation reactor connected across a pair of diametrically opposite junctions of the bridge, one of the junction being connected to an associated one of the three-phase AC output terminal of the three-phase inverter.

BRIEF DESCRIPTION OF THE DRAWINGS

The present invention will become more readily apparent from the following detailed description taken in conjunction with the accompanying drawings in which.

Throughout the Figures like reference numerals designate the identical or corresponding compartments.

DESCRIPTION OF THE PREFERRED EMBODIMENT

Figure 1:
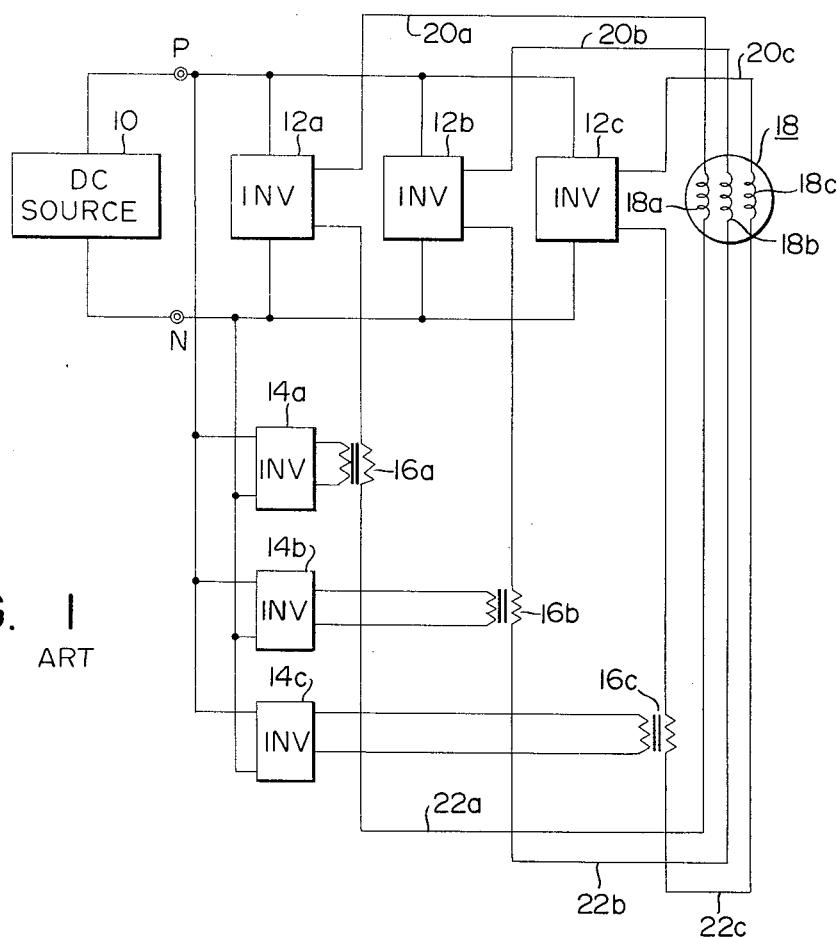
FIG. 1 is a block diagram of a conventional multiplexed inverter system for driving a synchronous motor with part illustrated in circuit configuration.

Referring now to FIG. 1 of the drawings, there is illustrated a conventional multiplexed inverter system for driving a synchronous motor. The arrangement illustrated comprises a DC source 10 including a pair of positive and negative terminals P and N respectively, a triad of first inverters 12a, 12b and 12c connected in parallel circuit relationship across the positive and negative terminals P and N respectively, another triad of second inverters 14a, 14b and 14c similarly connected in parallel circuit relationship across the two terminals P and N, and three electrically insulated transformers 16a, 16b and 16c connected across AC outputs of the second inverter 14a, 14b and 14c respectively. Then a synchronous motor generally designated by the reference numerals 18 is supplied by all these inverters. More specifically each of the first inverters 12a, 12b or 12c includes a pair of AC output one of which is connected to a different one of three-phase windings 18a, 18b or 18c of the synchronous motor 18 through an associated power supply lead 20a, 20b or 20c and the other of which is connected to a secondary winding of the associated transformers 16a, 16b or 16c. The secondary winding of each transormer 16a, 16b or 16c is serially connected to the phase winding 18a, 18b or 12c of the synchronous motor 18 through another power supply leads 22a, 22b or 22c respectively.

Figure 2:
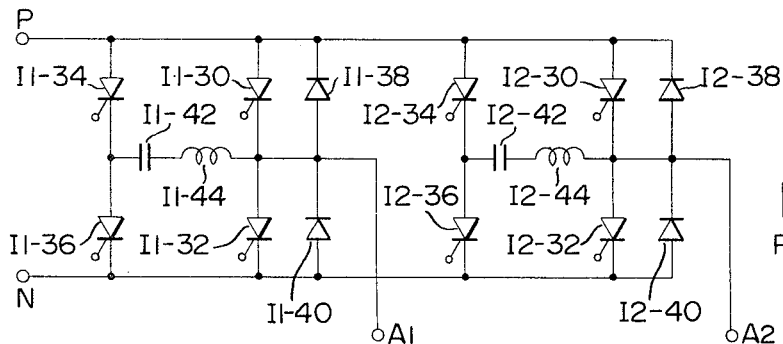
FIG. 2 is a circuit diagram of the single-phase inverter shown in FIG. 1.

Each pair of first and second inverters 12a and 14a, 12b and 14b or 12c and 14c are of a circuit configuration as shown in FIG. 2. In the arrangement illustrated a pair of main thyristors I1-30 and I1-32 are serially interconnected with the identical polarity and form a bridge with a pair of auxiliary thyristors I1-34 and I1-36 similarly interconnected. A semiconductor feedback diode I1-38 or I1-40 is connected across the main thyristor I1-30 or I1-32 with the opposite polarity. The bridge includes a pair of DC inputs connected across the positive and negative terminals P and N of the DC source 10 which is not shown in FIG. 2 and a pair of AC outputs across which a commutation reactor I1-42 is serially connected to a commutation capacitor I1-44. The components as described above forms a semiconductor inverter well known in the art.

The arrangement of FIG. 2 includes further a replica of the semiconductor inverter as described above connected across the positive and negative terminals P and N and including the components identical to those described above and designated by the reference character and numeral I2 suffixed with the reference numerals identifying the component. For example, I2-10 designates the main thyristor identical to those identified by I1-10.

The arrangement of FIG. 2 is well known in the art as a single-phase inverter and therefore the operation thereof need not be described in detail. However, for a better understanding of the operation of the arrangement as shown in FIG. 1, it will be sufficient to describe that a DC voltage across the positive and negative terminals P and N respectively is transformed to an AC voltage in the form of a train of rectangular waves which is, in turn developed across AC output terminals $A_1$ and $A_2$ connected to the junction of the main thyristors I1-30 and I1-32 and that of the main thyristors I2-30 and I2-32.

Upon starting the synchronous motor 18, the second inverters 14a, 14b and 14c connected to the insulated transformers 16a, 16b and 16c respectively are not operated as inverters but they are operated only to shortcircuit the associated transformers. More specifically, by applying simultaneously a conduction signal to the main thyristors I1-30 and I2-30 or I1-32 and I2-32, no voltage is developed across the AC output terminals $A_1$ and $A_2$ but only a current is permitted to flow freely therethrough. Under these circumstances, only the first inverters 12a, 12b and 12c are operated supply an electric power to the synchronous motor 18 until an operating frequency developed on the AC side thereof from a null magnitude. When the operating frequency reaches a predetermined magnitude, the second inverters 14a, 14b and 14c are initiated to be operated as inverters whereby voltages in rectangular waveforms are induced across the secondary windings of the electrically insulated transformers 16a, 16b and 16c respectively. As a result, the sum of the output voltage from each of the first inverters and that from the associated second inverter is applied to an associated one of the phase windings 18a, 18b or 18c of the synchronous motor 18. At that time, the arrangement of FIG. 1 is initialed to be operated as a multiplexed inverter system.

From the foregoing it is seen that the arrangement of FIG. 1 makes it possible to operate the synchronous motor in a range of from the DC to the AC mode at any desired frequency in the manner well known in the art.

Conventional inverter systems such as described above have been disadvantageous in that six power supply leads are required to connect the synchronous motor to the inverters and one pair of first and second inverters or a single-phase inverter as shown in FIG. 2 is necessarily provided for each phase of the synchronous motor resulting in large-sized, expensive systems.

The present invention contemplates to eliminate the disadvantages of the prior art practice as described above by the provision of an inverter system for driving a synchronous motor, using a three-phase inverter of a three-phase full-wave bridge connection as inverter means and including four power leads to a synchronous motor including three star-connected phase windings, one of the power supply leads being utilized as a neutral lead to the synchronous motor.

Figure 3:
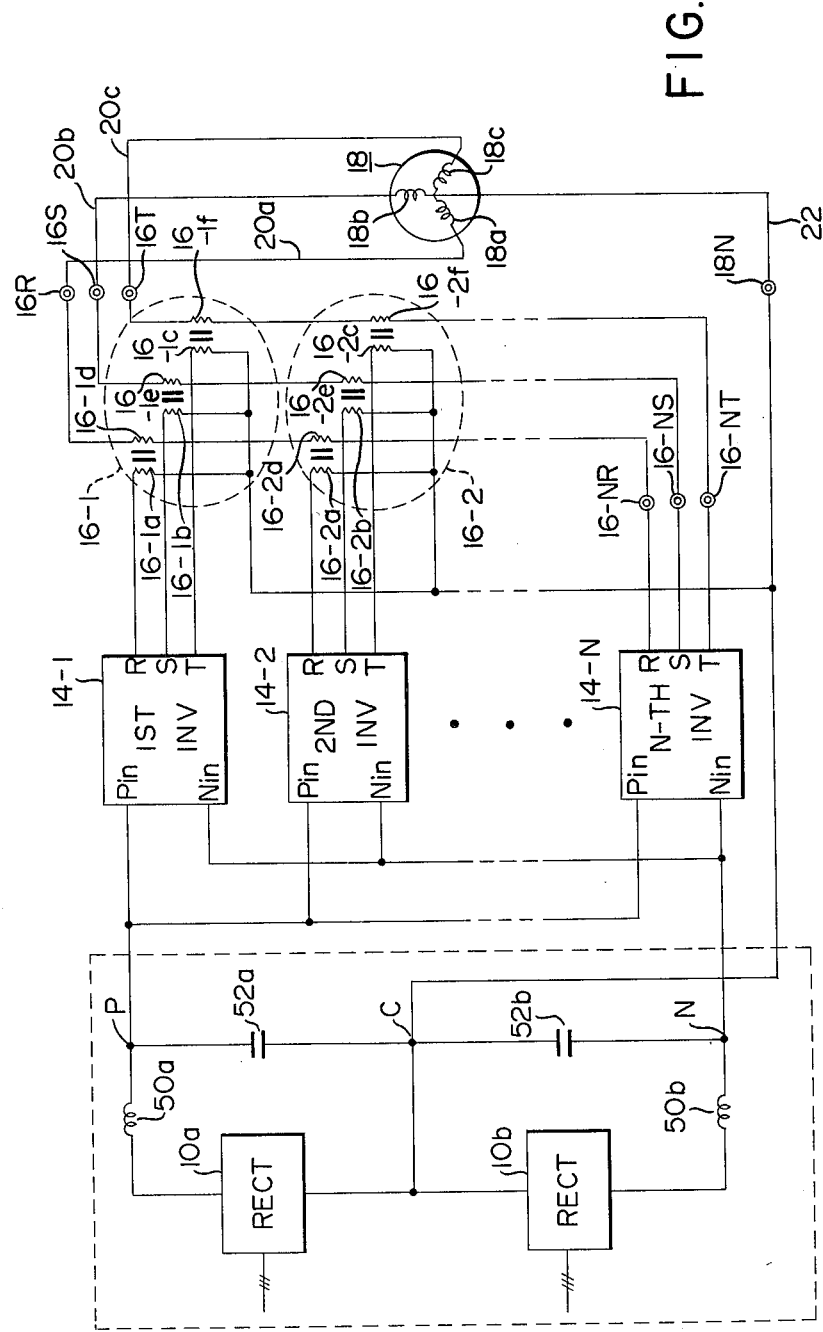
FIG. 3 is a combined block and circuit diagram of one embodiment according to the synchronous motor driving inverter system of the present invention.

Referring now to FIG. 3, there is illustrated one embodiment according to the inverter system of the present invention for driving a synchronous motor. The arrangement illustrated comprises a DC source generally designated by the reference numeral 10 including a pair of serially connected rectifier circuits 10a and 10b forming a positive and a negative portion thereof respectively, a pair of reactors 50a and 50b connecting the associated rectifier circuits 10a and 10b to the positive and negative terminals P and N respectively, and a pair of capacitor 32a and 32b connected across the positive and negative terminals P and N and an intermediate terminal C respectively. The intermediate terminal C is connected to the junction of the rectifier circuits 10a and 10b.

N three-phase inverters 14-1, 14-2, ..., 14-N are connected in parallel circuit relation across the positive and negative terminals P and N respectively by having positive inputs $P_{in}$ thereof connected together to the positive terminal P of the source 10 and negative inputs $N_{in}$ in thereof connected together to the negative terminal N of the source 10. Each of the three-phase inverters 14-1, 14-2, ..., 14-N includes three AC output terminals R, S and T forming a set of three-phase AC output terminals.

Figure 4:
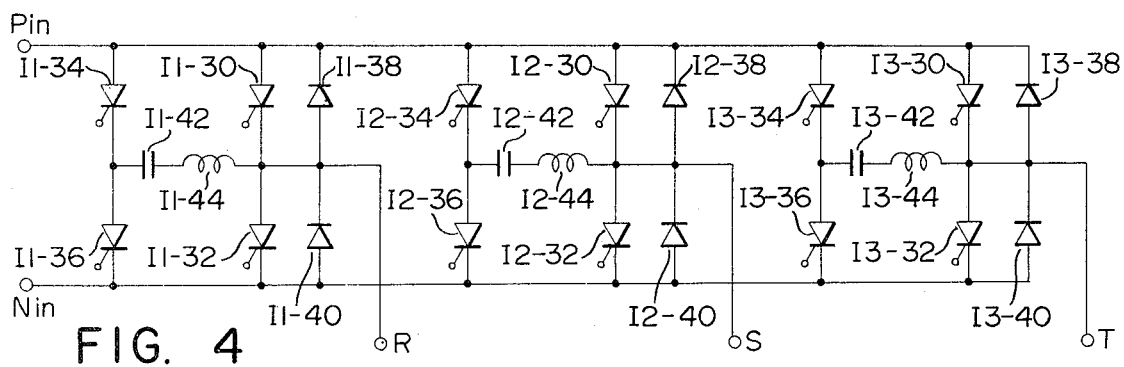
FIG. 4 is a circuit diagram of the three-phase inverter shown in FIG. 3.

Each of the three-phase inverters 14-1, 14-2, ..., 14-N is preferably of a circuit configuration as shown in FIG. 4. The arrangement illustrated is different from that shown in FIG. 2 only in that in FIG. 4 the semiconductor inverter as described above is provided for each phase of the system. That is, the three semiconductor inverters are connected in parallel circuit relationship across the positive and negative input terminals $P_{in}$ and $N_{in}$ respectively, and include the AC output terminals R, S and T respectively.

In FIG. 4, like reference character and numerals designate the components included in the semiconductor inverters with the AC outputs R and S and identical to those shown in FIG. 2 and the components included in the semiconductor inverter with the AC output T are designated by the reference character and numeral I3 suffixed with the reference numerals identifying the components. For example, I3-32 designates the main thyristor identical to that identified by I1-32 or I2-32.

Referring back to FIG. 3, the first, second, ..., (N−1)-th three-phase inverters 14-1, 14-2, ..., 14-(N−1) are connected to a first, a second, ..., a(N−1)-th electrically insulated three-phase transformers 16-1, 16-2, ..., 16-(N−1) respectively. Those three-phase transformers are identical to one another and one of them, for example, the first three-phase transformer 16-1 will now be described. The first three-phase transformer 16-1 includes three primary windings 16-1a, 16-1b and 16-1c connected at one end to the AC outputs terminals R, S and T of the associated three-phase inverter respectively and at the other ends to a neutral point which is, in turn connected to the intermediate terminal C of the source 10. Therefore the three primary windings 16-1a, 16-1b and 16-1c are connected into a star configuration. The three-phase transformer 16-1 includes three secondary windings 16-1d, 16-1e and 16-1f one for each phase of the system.

Windings of each of the remaining transformers are designated by the reference numeral identifying that transformer and suffixed with the reference characters a, b, c, d, e or f. For example, 16-2d designates the secondary winding of the second transformer 16-2 identical in phase of the system to the secondary winding 16-1d of the first transformers.

For each phase of the system the secondary windings of all the three-phase transformers are serially interconnected to form a series combination of the secondary windings. For example, the secondary windings 16-1a, 16-2a, ..., 16-Na are identical in phase of the system to one another and form a series combination. Three series combinations of the secondary windings thus formed are connected at one end to AC output terminals 16-R, 16-S and 16-T forming a set of three-phase AC output terminal for three-phase transformers 16-1, 16-2, ..., 16-N and at the other ends to AC output terminals 14-NR, 14-NS and 14-NT forming the other set of three-phase AC output terminal and connected to the AC outputs R, S and T of the N-th three-phase inverter 14-N.

The AC output terminals 16R, 16S and 16T are connected via three power supply leads 20a, 20b and 20c to three-phase windings 18a, 18b and 18c connected in a star configuration of the synchronous motor 18. Therefore the terminals 18R, 16S and 16T serve also as a set of three-phase AC input terminals of the synchronous motor 18. A neutral point to which the phase windings 18a, 18b and 18c are connected together is connected through a neutral leads 22 to a neutral terminal 18N of the synchronous motor 18 subseauently connected to the intermediate terminal C of the source 10.

Figure 5:
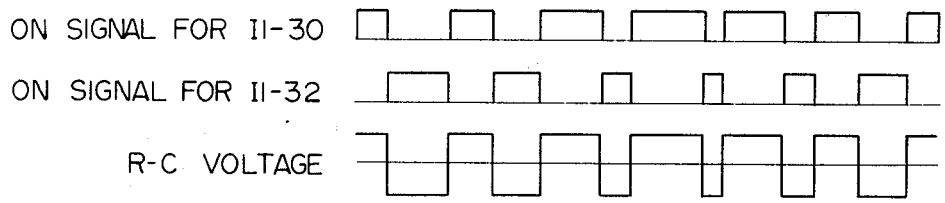
FIG. 5 is a graph illustrating waveforms developed at various points in the arrangement shown in FIG. 4.

The operation of the arrangement as shown in FIG. 4 is well known in the art and therefore the detailed description therefor is omitted. However, for a better understanding of the present invention, the arrangement of FIG. 4 will now be described in terms of the manner in which an AC voltage in the form of a train of rectangular waveforms is developed across each of the AC output terminals R, S and T and the intermediate terminal C of the source 10 and with reference to FIG. 5 wherein there are illustrated waveforms developed at various points in the arrangement of FIG. 4.

In the arrangement of FIG. 4, all the main thyristors are sorted into a positive group including the main thyristors I1-30, I2-30 and I3-30 and a negative group including the main thyristors I1-32, I2-32 and I3-32. The positive group is operatively associated with the negative group to form three pairs of the main thyristors one pair for each phase of the system. The main thyristors of each pair, for example, the main thyristors I1-30 and I1-32 are alternately put in its conducting state. Assuming now that the main thyristor I1-30 is conducting while the main thyristor I1-32 is nonconducting, the AC output terminal R is equal in potential to the DC input terminal Pin. On the contrary, with the main thyristors I1-30 and I1-32 put in the nonconducting and conducting states respectively, the AC output terminals R is equal in potential to the DC input terminal Nin. As a result, a DC voltage across the capacitor 52a due to the source 10 is applied across the AC output terminal R and the intermediate terminal C of the source 10 during the conduction of the main thyristor i1-30 (see the uppermost waveform labelled "ON SIGNAL FOR I1-30", FIG. 5). On the other hand, a DC voltage across the capacitor 52b due to the source 10 is applied across the AC output terminal R and the intermediate terminal C with the reverse polarity during the conduction of the main thyristor I1-32 (see an intermediate waveform labelled "ON SIGNAL FOR I1-32", FIG. 5). In the latter case, the voltage across the capacitor 52a is arranged to be equal in magnitude to that across the capacitor 52b. Accordingly an AC voltage in the form of a train of rectangular waveforms is developed across the AC output terminal R and the intermediate terminal C of the source 10 as shown at the lowermost waveform labelled "R-C VOLTAGE" in FIG. 5.

By controlling similarly the conduction of the main thyristors I2-30 and I2-32, a similar AC voltage in the form of a train of rectangualr waveforms is developed across the AC output terminal S and the intermediate terminal C.

Also a similar AC voltage in the form of a train of rectangular waveforms is developed across the AC output terminal T and the intermediate terminal C by controlling similarly the conduction of the main thyristors I3-30 and I3-32.

The operation of the arrangement as shown in FIG. 3 will now be described on the assumption that N has a value of three (3) and in conjunction with FIG. 6 wherein there are illustrated waveforms developed at various points in the arrangement shown in FIG. 3. In the assumed conditions, the arrangement of FIG. 3 is modified to include the first and second three-phase inverter 14-1 and 14-2 connected to the first and second three-phase transformers 16-1 and 16-2 respectively and the N-th in this case, third three-phase inverter 14-N connected directly to the three terminals 14-NR, 14-NS and 14-NT of the three secondary windings 16-2d, 16-2e and 16-2f of the second three-phase transformer 16-2.

In each of the three-phase inverters the main thyristors are alternately put in their conducting and non-conducting states in response to command voltages applied thereto resulting in AC voltages in the form of a train of rectangular waveforms appearing across each of the three-phase AC terminals R, S and T and the intermediate terminal C of the source 10 as will readily be understood from the description made above in conjunction with FIG. 4. The three-phase AC voltage generated by the first three-phase inverter 16-1 is applied to the three primary windings 16-1a, 16-1b and 16-1c of the first three-phase transformer (see waveform A, the upper portion labelled "VOLTAGE ACROSS 16-1a", FIG. 6) to induce AC voltages identical in waveform to one another across the three secondary windings 16-1d, 16-1e and 16-1f respecrively (see waveform A, the lower portion labelled "VOLTAGE ACROSS 16-1d", FIG. 6).

Figure 6:
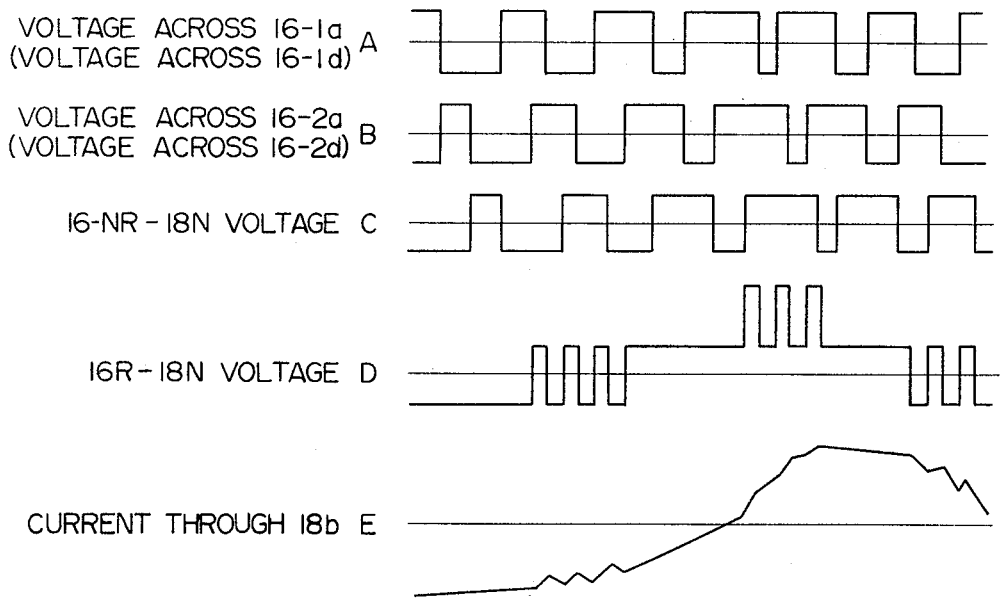
FIGS. 6 and 7 are graphs illustrating waveforms developed at various points in the arrangement shown in FIG. 3.

Similarly the three-phase AC voltage generated by the second three-phase inverter 14-2 is applied to the three primary windings 16-2a, 16-2b and 16-2c of the second three-phase transformer 16-2 (see waveform B, the upper portion labelled "VOLTAGE ACROSS 16-2a", FIG. 6) to induce AC voltages identical in waveform to one another across the three secondary windings 16-2d, 16-2e and 16-2f respectively (see waveform B, the lower portion labelled "VOLTAGE ACROSS 16-2d", FIG. 6).

Finally the three-phase voltage generated by the third three-phase inverter 16-N is applied across the neutral terminal 18N of the synchronous motor 18 and the AC output terminals 14-NR, 14-NS and 14-NT connected to the three secondary windings 16-2d, 16-2e and 16-2f of the second three-phase transformer 16-2.

As described above, the three secondary windings of the first three-phase transformer 16-1 are serially connected to those of the second three-phase transformer 16-2 identical in phase of the system to the same so that the addition of voltages from those two transformers is effected for each phase of the system. This results in the sum of the voltages appearing across an associated one of the AC output terminals 14-NR, 14-NS and 14-NT and that AC output terminal 16R, 16S or 16T connected thereto. For example, the terminals 14-NR and 16R have developed thereacross the sum of the voltage induced across the secondary winding 16-1d of the first three-phase transformer 16-1 and that induced across the secondary winding 16-2d of the second three-phase transformer 16-2.

This it true in the case of the remaining phases of the system.

Accordingly, the neutral terminal 18N and the terminals 16R, 16S and 16T have developed thereacross voltages each obtained as a result of the AC voltages generated by the three-phase inverters 16-1, 16-2 and 16-N being added to one another for each phase of the system. Waveform C shown in FIG. 6 depicts a voltage developed across the terminal 16-NR and the neutral terminal 18N.

From the foregoing it is seen that the arrangement of FIG. 3 modified to include three three-phase inverters and the two three-phase transformers is operative to multiplex the output voltage from the three-phase inverters on three stages and apply the multiplexed output voltages to the three-phase windings 18a, 18b and 18c of the synchronous motor 18. Consequently the resulting current flows through each of the phase windings 18a, 18b or 18c of the synchronous motor 18 while ripples included therein are maintained small as shown at waveform E labelled "CURRENT THROUGH 18b", in FIG. 6).

Therefore it will readily be understood that the arrangement of FIG. 3 is operative to multiplex output voltages from three-phase inverters in multiple stages whose number is determined by the number of the three-phase inverters involved and flow each of the phase windings 18a, 18b or 18c of the synchronous motor 18 with a current small in ripples.

Subsequently, the arrangement of FIG. 3 will be described in conjunction with the starting mode of operation and with respect to FIG. 7 wherein there are illustrated waveforms developed at various points in the arrangement operated in the starting mode or the like. At an output frequency from the three-phase inverters below a predetermined magnitude, each of all the three-phase inverters except for the N-th inverter 16-N is operated to switch alternately the main thyristors of the positive and negative groups as described above in conjunction with FIG. 4 at predetermined equal time intervals without performing the inverting operation. As a result, the main thyristor of the positive group, for example, the main thyristor I1-30 (see FIG. 4) is equal in conduction time interval to that of the negative group, for example, the main thyristor I1-32 for each phase of the system. This means that the primary windings of each of the three-phase transformers connected to the three-phase inverters, for example, the three-phase transformers 16-1 and 16-2 are applied with respective rectangular voltages each including its positive portion equal in area to its negative portion as shown at waveforms A and B labelled "VOLTAGE ACROSS 16-1a" and "VOLTAGE ACROSS 16-2a" respectively in FIG. 7. Accordingly the three-phase transformers are prevented from being saturated.

Figure 7:
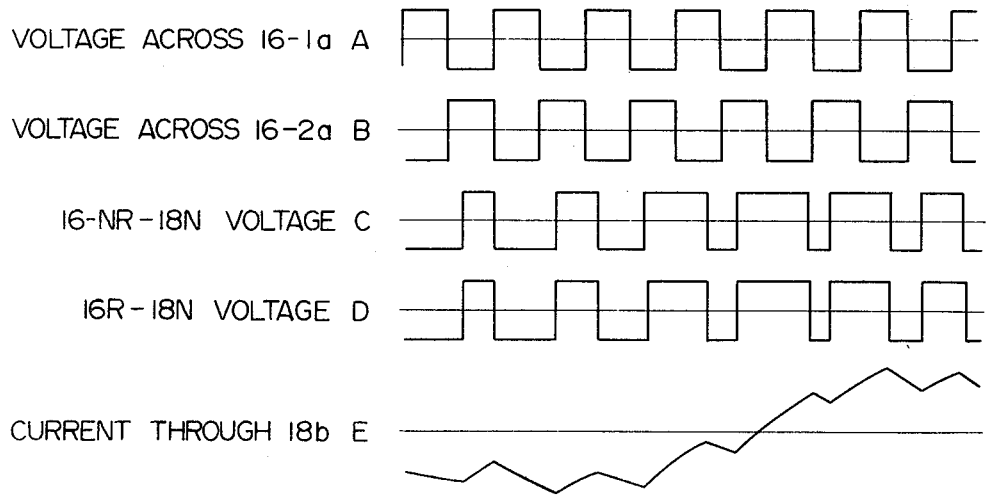

At the same time the N-th three-phase inverter 16-N is maintained to be normally operated in the inverting mode to permit the three-phase AC voltage from the inverter 16-N to be applied across the neutral terminal 18N and the terminals 14-NR, 14-NS and 14-NT (see waveform C labelled "14-NR—18N VOLTAGE", FIG. 7). Under these circumstances, voltages developed between the terminals 16R and 14-NR, between the terminals 16S and 14-NS and between the terminals 16T and 14-NT respectively average to be null.

Consequently three components of the three-phase AC voltage from the N-th three-phase inverter 16-N are applied across the terminals 16R and 18N, across the terminals 16S and 18N and across the terminal 6T and 18N respectively while remaining intact (see waveform D labelled "16R—18N VOLTAGE", FIG. 7). Therefore the N-th three-phase inverter 16-N can flow the phase windings 18a, 18b and 18c of the synchronous motor 18 with respecive currents such as shown at waveform E labelled "CURRENT THROUGH 18b", in FIG. 7.

The present invention has several advantages. For example, the present invention can multilex output voltages from a plurality of three-phase inverters with their simple structure and still drive a synchronous motor at any desired frequency starting with direct current. Also the inverter system of the present invention can be cheaply manufactured because a plurality of three-phase inverters supply a multiplexed three-phase voltage to the synchronous motor only through four power supply leads. Further the resulting reliability can be improved because the number of the components involved decreases.

While the present invention has been illustrated and described in conjunction with a single preferred embodiment thereof it is to be understood that numerous changes and modifications may be resorted to without departing from the spirit and scope of the present invention. For example, the present invention has been illustrated and described in conjunction with the rotation type synchronous motor but the same is equally applicable to linear type synchronous motors or linear motors. In addition, the present invention may be effective for driving induction motors.

What we claim is:

1. An inverter system for driving a synchronous motor, comprising a synchronous motor including star-connected phase windings and a set of three-phase AC input terminals and a neutral terminal, a DC source including a positive terminal, a negative terminal and an intermediate terminal for deriving an intermediate voltage lying between voltages at the positive and negative terminals, the intermediate terminal being connected to said neutral terminal of said synchronous motor, N three-phase inverters connected in parallel circuit relationship across said positive and negative terminals of said DC source where N designates an integer having a value larger than unity, each of said three-phase inverters including a set of three-phase AC output terminals and transforming a DC power from said DC source to a three-phase AC power, (N−1) electrically insulated three-phase transformers connected to the (N−1) three-phase inverter respectively so that primary windings of each three-phase transformer are connected in a star configuration to said set of three-phase AC terminals of said three-phase inverter connected thereto and secondary windings thereof are connected in series circuit relationship to those of the other three-phase transformers to form series combinations one for each phase of the system, said star-connected primary windings of each of the three-phase transformers including a neutral point connected to said intermediate terminal of said DC source, said series combinations being connected at one end to said set of three-phase AC input terminals of said synchronous motor and at the other ends to said set of three-phase AC output terminals of the three-phase inverter not connected to the three-phase transformer.

2. An inverter system for driving a synchronous motor as claimed in claim 1 wherein said N has a value of three (3).

3. An inverter system for driving a synchronous motor as claimed in claim 1 or 2 wherein each of the three-phase inverters comprise three semiconductor inverters each including four thyristors connected into a bridge configuration and a series combination of a commutation capacitor and a commutation reactor connected across a pair of diametrically opposite junctions of the bridge, one of the junction being connected to an associated one of said three-phase AC output terminal of the three-phase inverter.

* * * * *